(12) United States Patent
Nandagopalan et al.

(10) Patent No.: US 9,094,071 B2
(45) Date of Patent: Jul. 28, 2015

(54) BEAMFORMING PROTOCOL FOR WIRELESS COMMUNICATIONS

(75) Inventors: Saishankar Nandagopalan, San Diego, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 537 days.

(21) Appl. No.: 12/612,662

(22) Filed: Nov. 4, 2009

(65) Prior Publication Data

US 2010/0111215 A1     May 6, 2010

Related U.S. Application Data

(60) Provisional application No. 61/111,681, filed on Nov. 5, 2008.

(51) Int. Cl.
  *H04B 1/00*  (2006.01)
  *H04B 15/00* (2006.01)
  *H04B 7/06*  (2006.01)

(52) U.S. Cl.
  CPC ............ *H04B 7/0617* (2013.01); *H04B 7/0626* (2013.01); *H04B 7/0628* (2013.01)

(58) Field of Classification Search
  USPC .................. 455/522, 69, 63.4, 562.1, 575.7
  See application file for complete search history.

(56) References Cited

U.S. PATENT DOCUMENTS

| 7,898,478 B2 * | 3/2011 | Niu et al. ................ 342/377 |
| 8,170,617 B2 * | 5/2012 | Nassiri-Toussi et al. .. 455/562.1 |
| 8,243,749 B2 * | 8/2012 | Basson et al. ............. 370/441 |
| 2007/0270173 A1 * | 11/2007 | Niu et al. .................. 455/522 |
| 2008/0240031 A1 * | 10/2008 | Nassiri-Toussi et al. ..... 370/329 |
| 2008/0254752 A1 * | 10/2008 | Oh et al. ...................... 455/83 |
| 2009/0232245 A1 * | 9/2009 | Lakkis ....................... 375/267 |
| 2010/0087227 A1 * | 4/2010 | Francos et al. ............. 455/562.1 |
| 2011/0045785 A1 * | 2/2011 | Sutskover et al. .............. 455/69 |
| 2011/0075606 A1 * | 3/2011 | Yamaura ..................... 370/328 |
| 2011/0211490 A1 * | 9/2011 | Nikula et al. ................ 370/252 |
| 2013/0129000 A1 * | 5/2013 | Fischer et al. .............. 375/267 |

OTHER PUBLICATIONS

IEEE STD 802.11g TM—2003; IEEE-SA Standards Board; Jun. 12, 2003.*

* cited by examiner

*Primary Examiner* — Edward Urban
*Assistant Examiner* — Rui Hu
(74) *Attorney, Agent, or Firm* — Garlick & Markison; Kevin L. Smith

(57) ABSTRACT

Beamforming protocol for wireless communications. Various communications are made between an originating communication device and a remote communication device to effectuate steered communications there between. The beamforming approach presented herein is applicable and adaptable to communication devices having any combination of omni-directional and directional transmit and receive functionality (e.g., the transmit functionality and the receive functionality both being omni-directional; the transmit functionality being directional and the receive functionality being omni-directional; or the transmit functionality and the receive functionality both being are directional). The beamforming protocol presented herein allows for all combinations of communication device types and also provides collision rules as may be performed in accordance with the beamforming configuration.

20 Claims, 15 Drawing Sheets

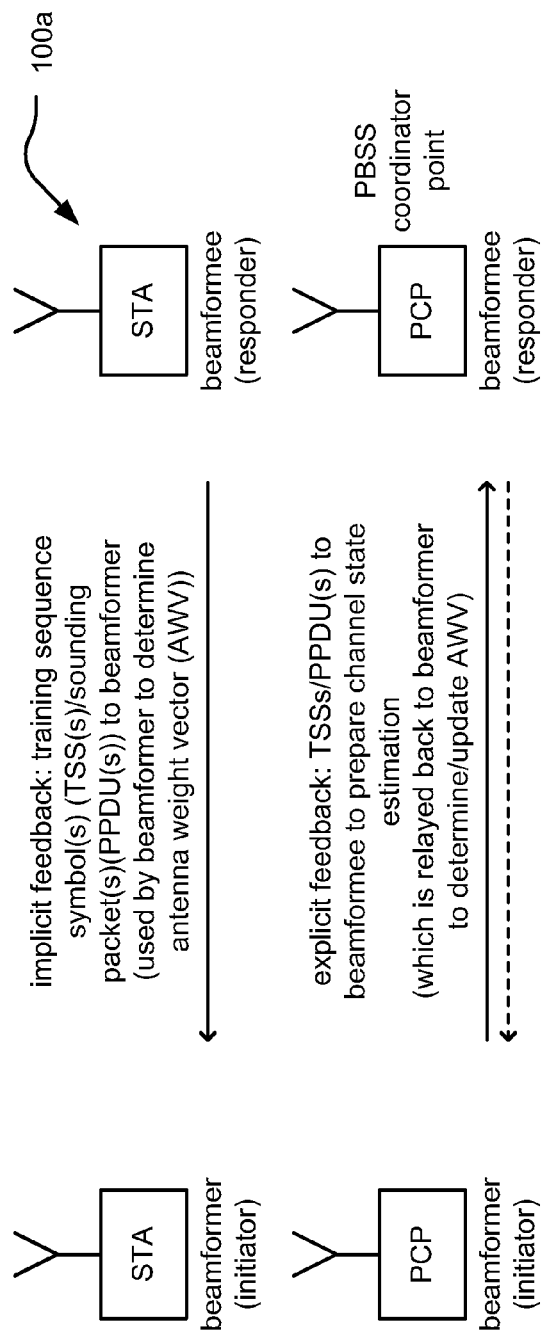
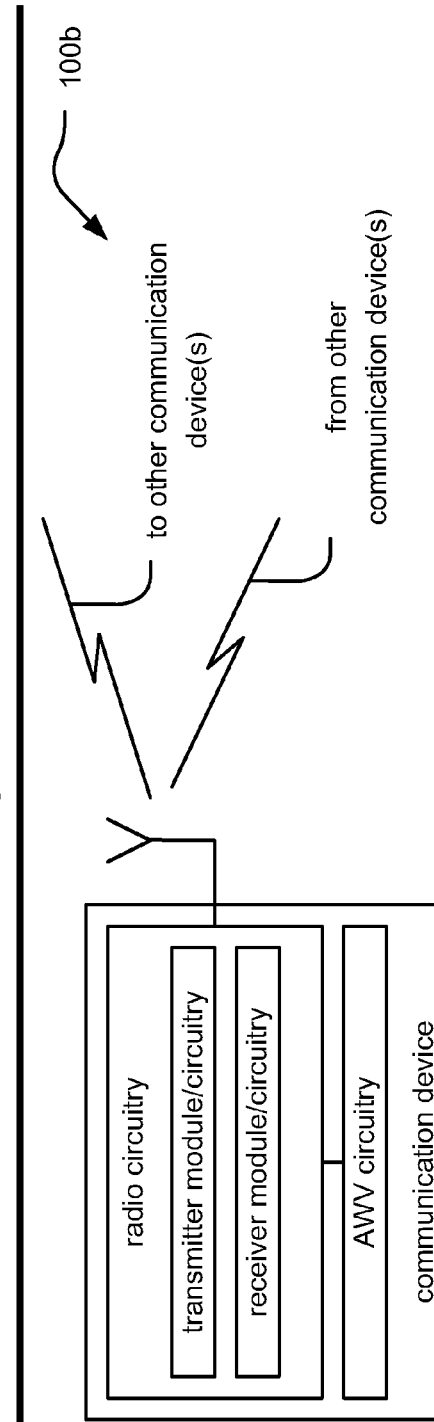
Fig. 1A
Fig. 1B

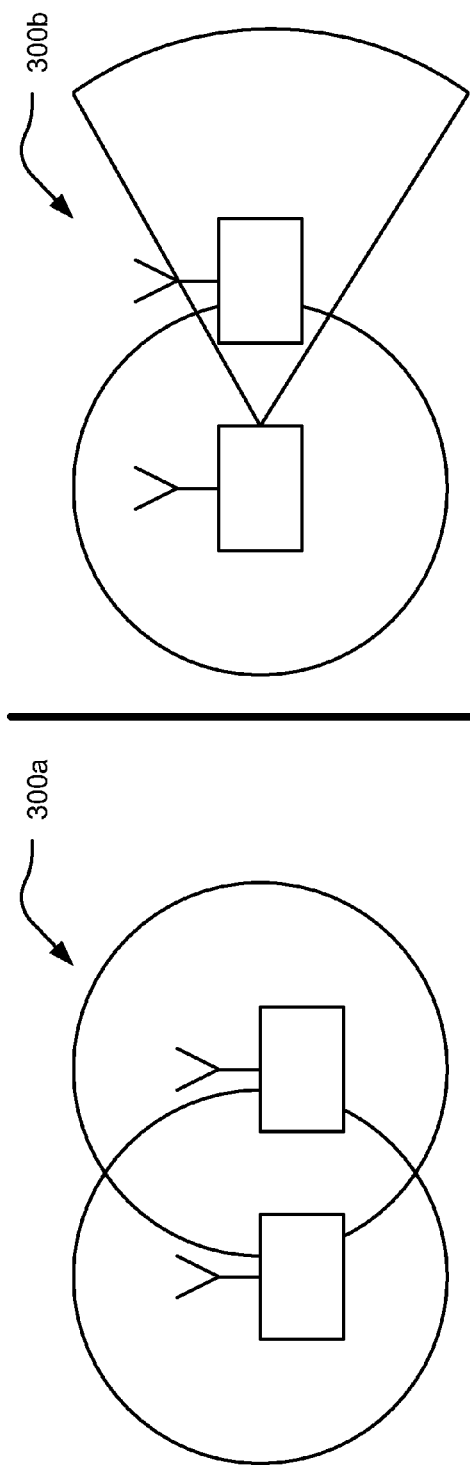
Fig. 3A (class A – capable of B & C)
Fig. 3B (class B – capable of C)
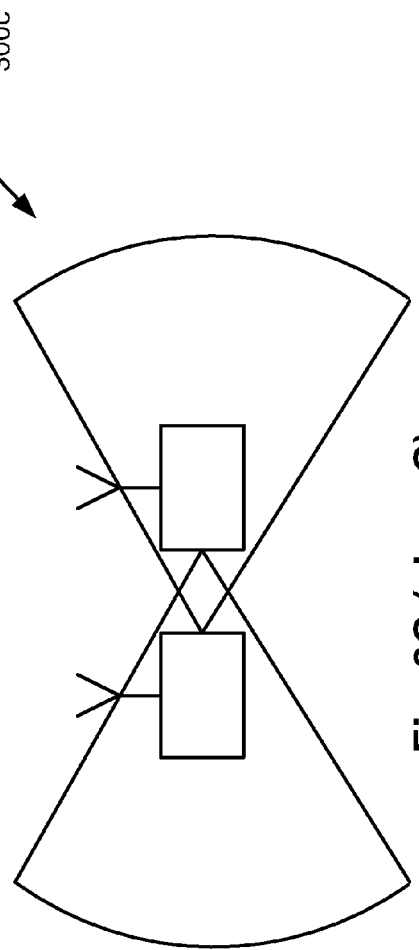
Fig. 3C (class C)

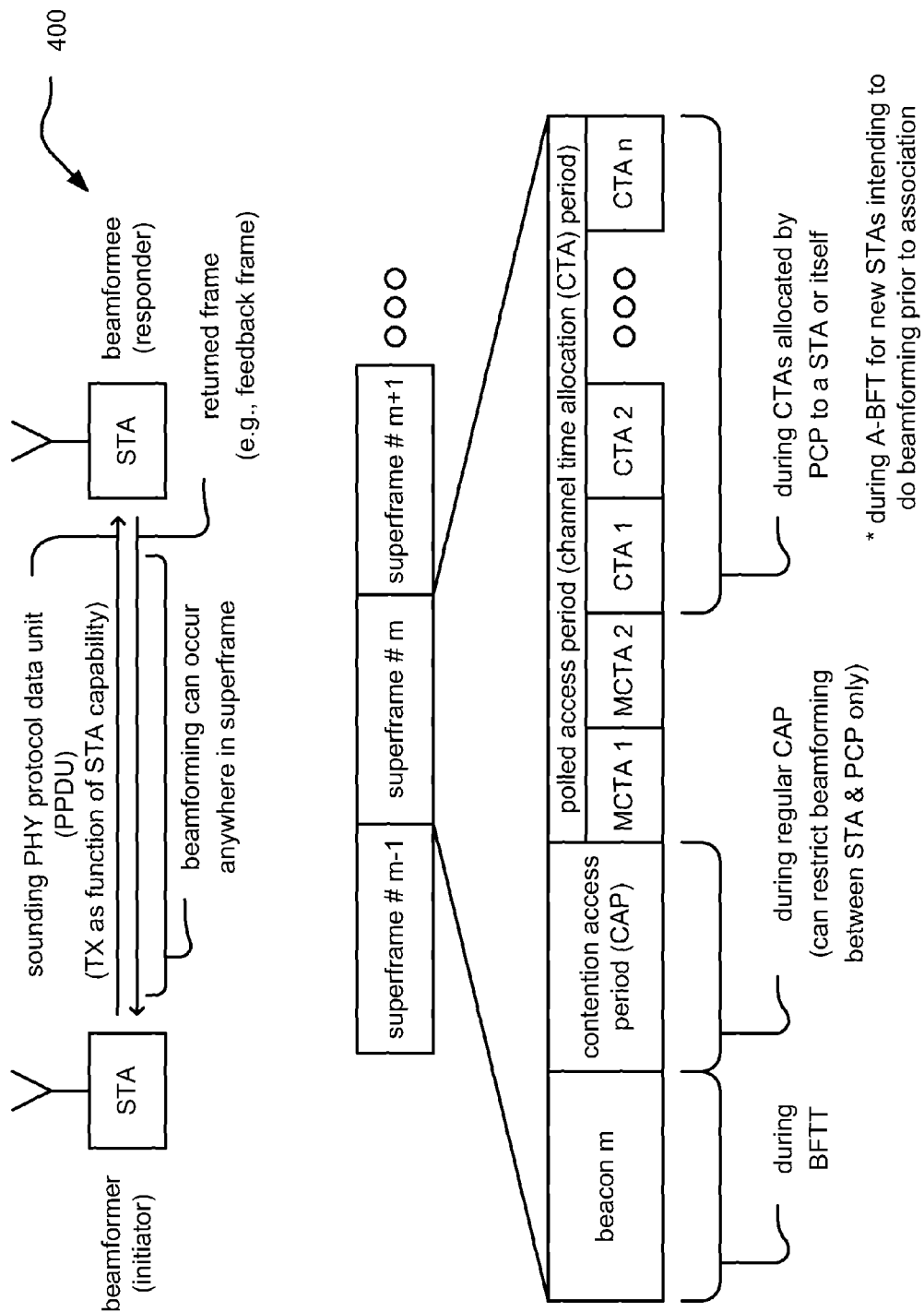
Fig. 4 (general protocol)

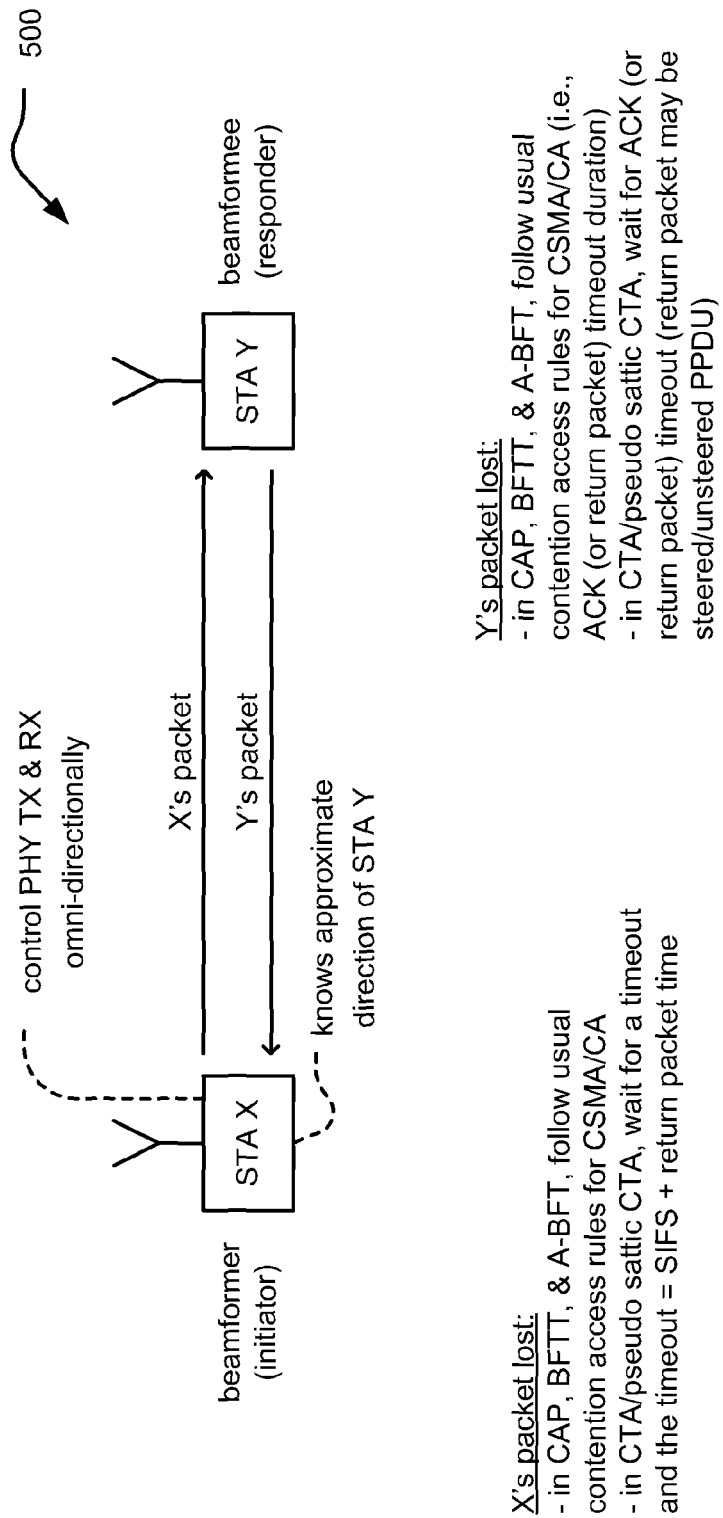
Fig. 5 (class A protocol)

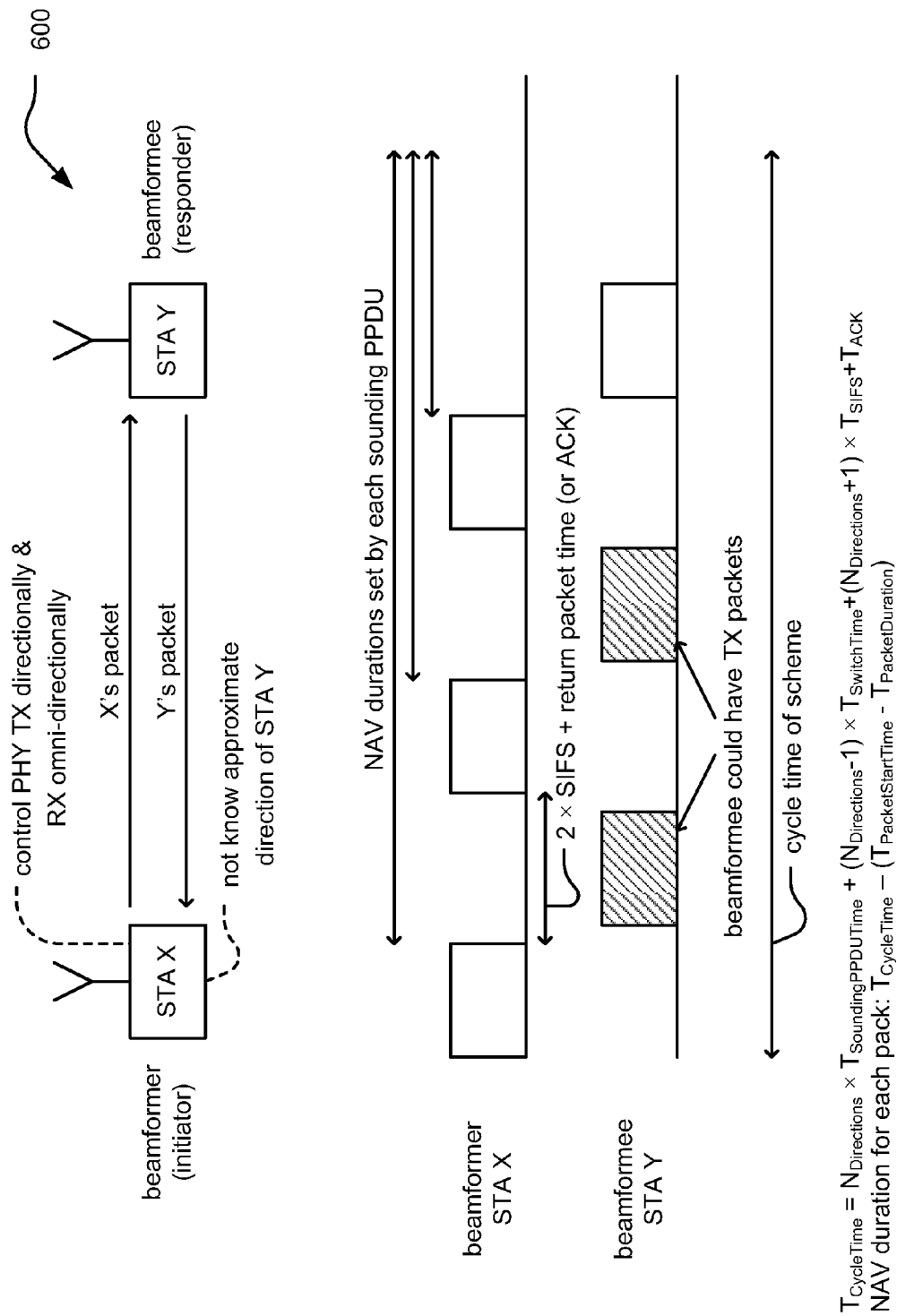
Fig. 6 (class B(1) protocol)

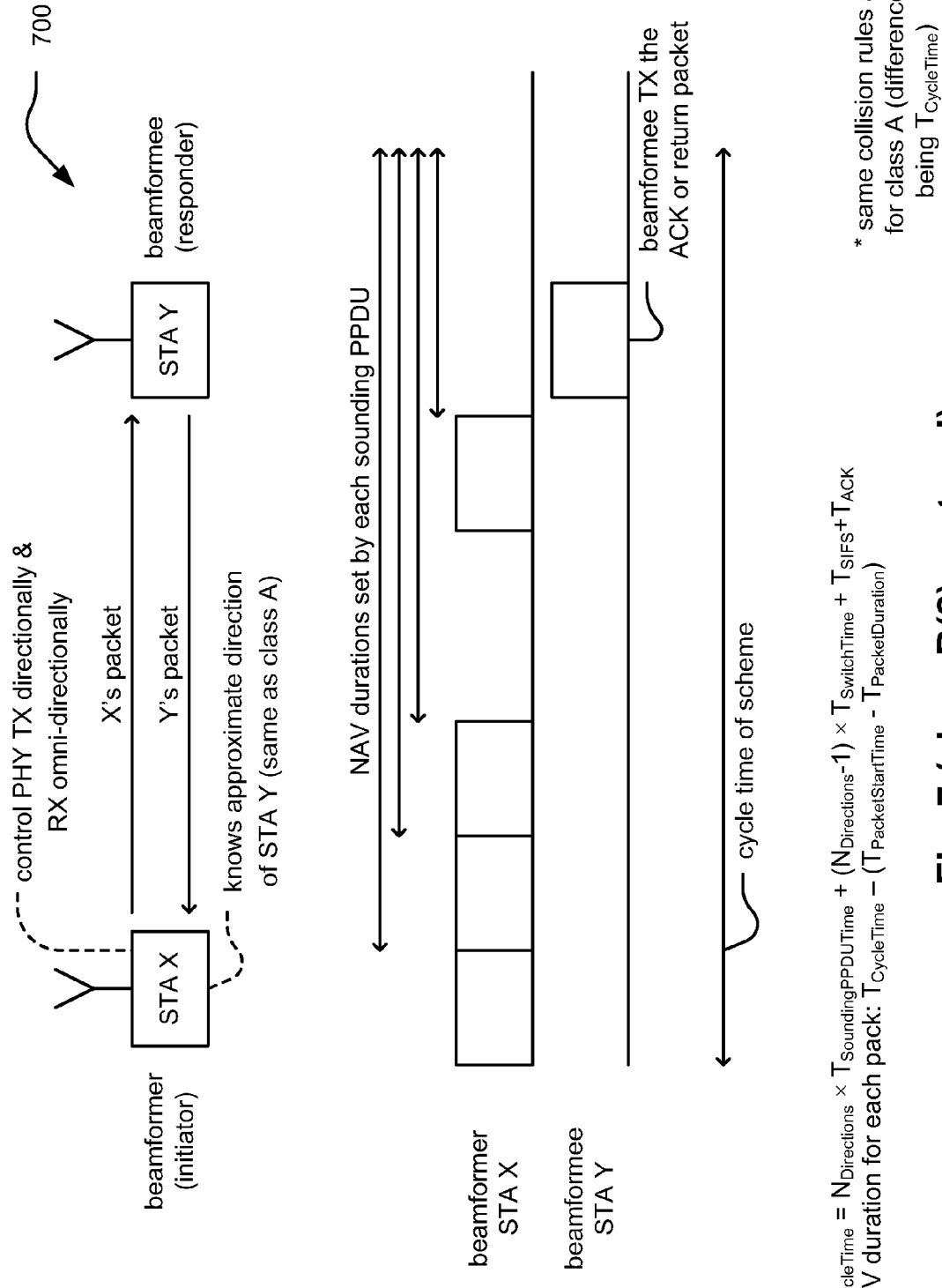
Fig. 7 (class B(2) protocol)

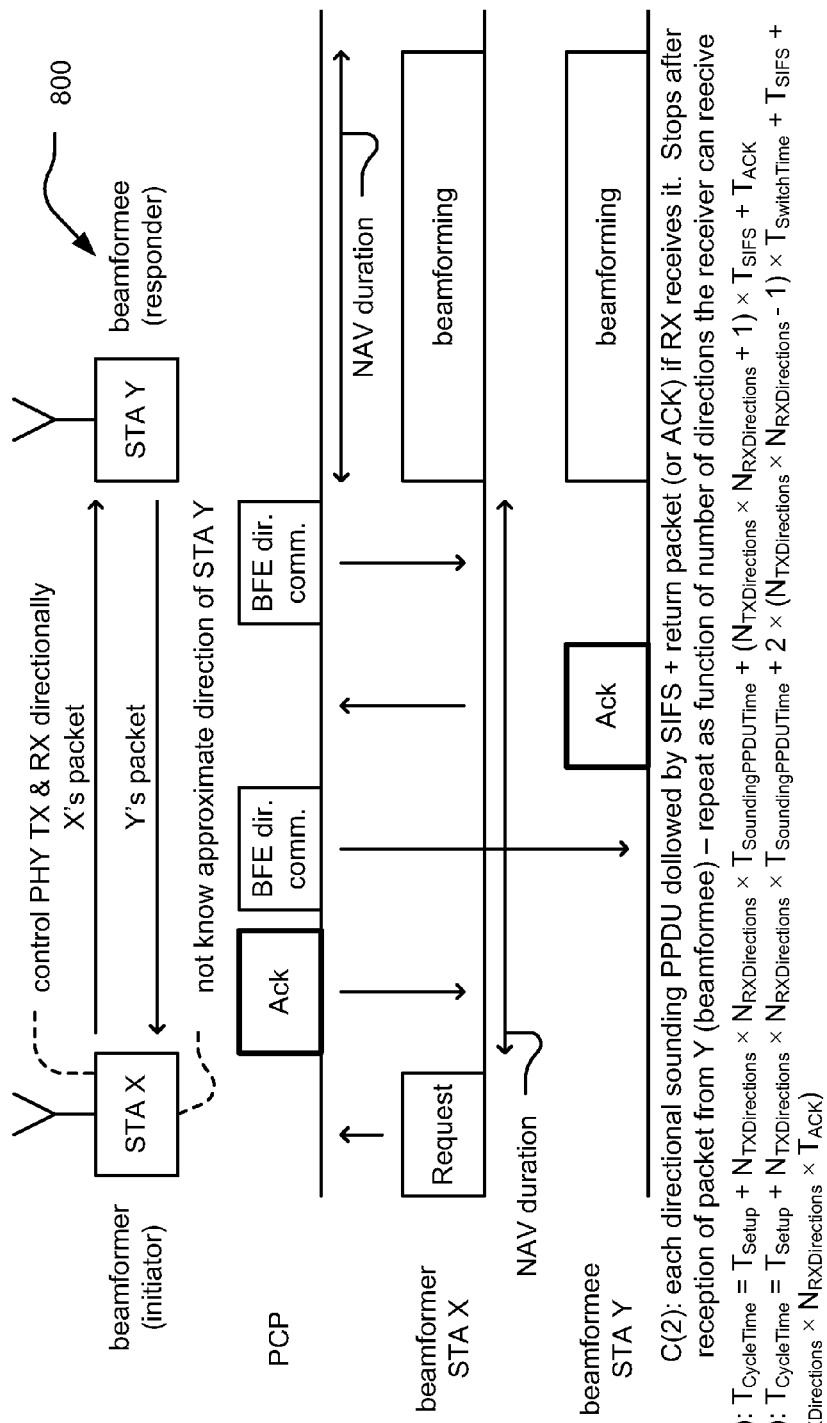
Fig. 8 (class C(1) & C(2) protocol)

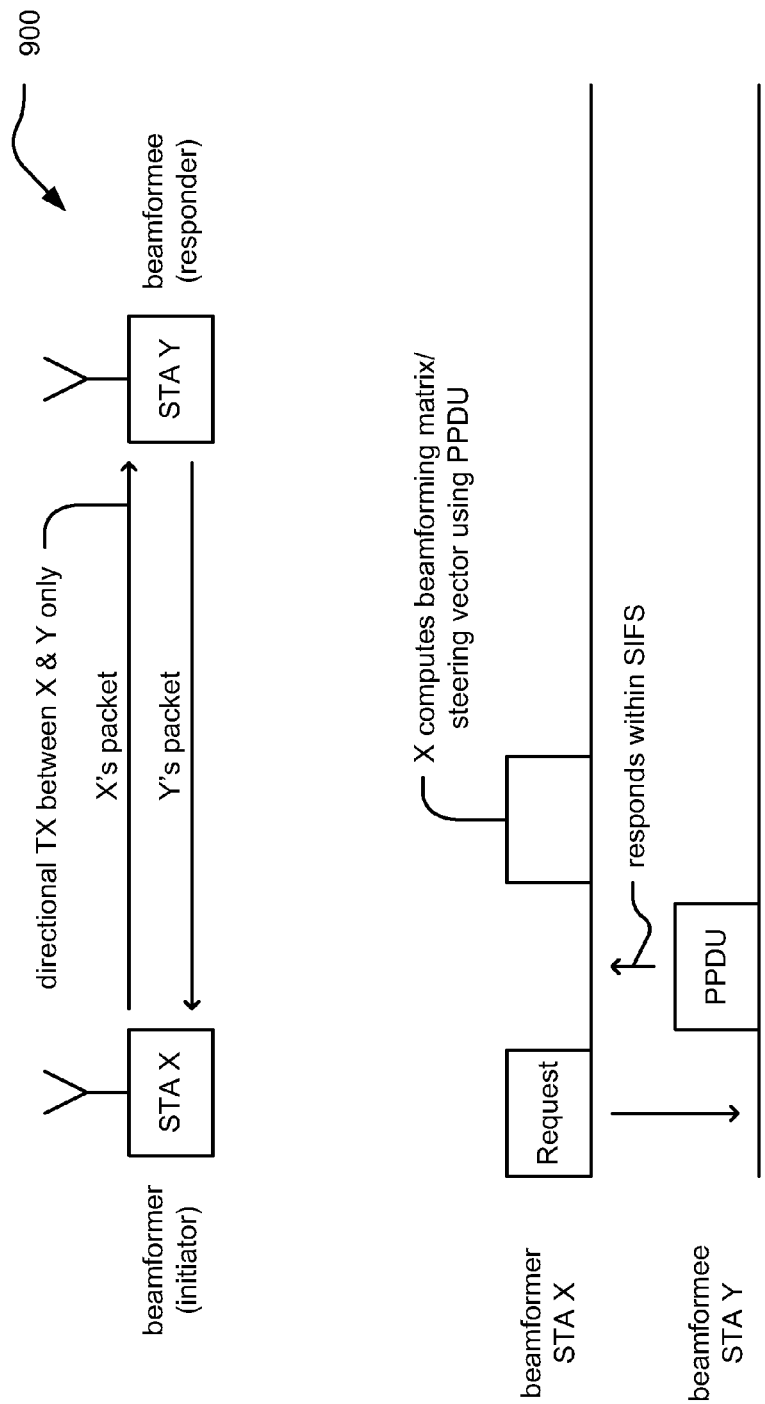
Fig. 9 (class A: uni-directional transmissions (implicit))

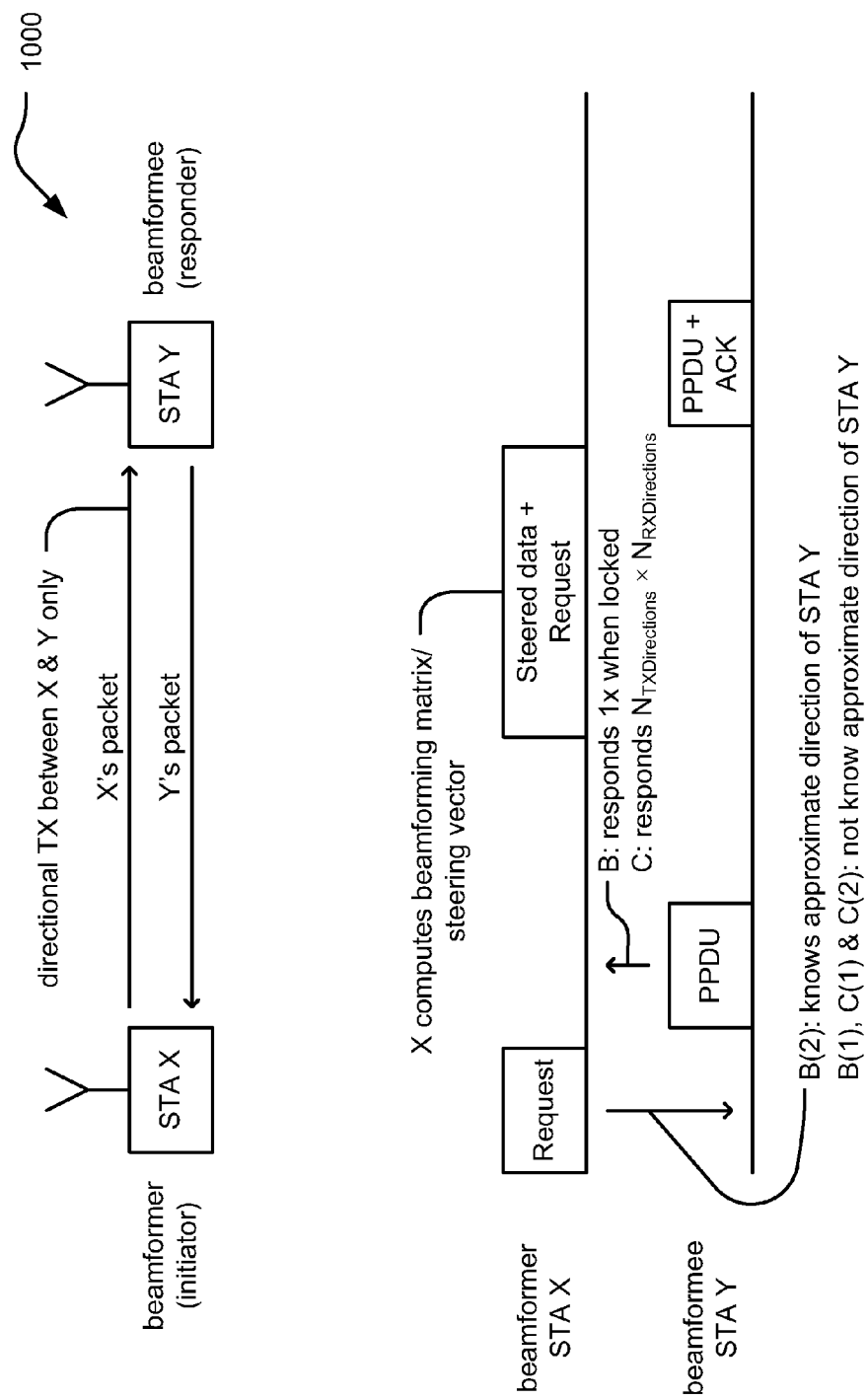
Fig. 10 (class B & C: uni-directional transmissions (implicit))

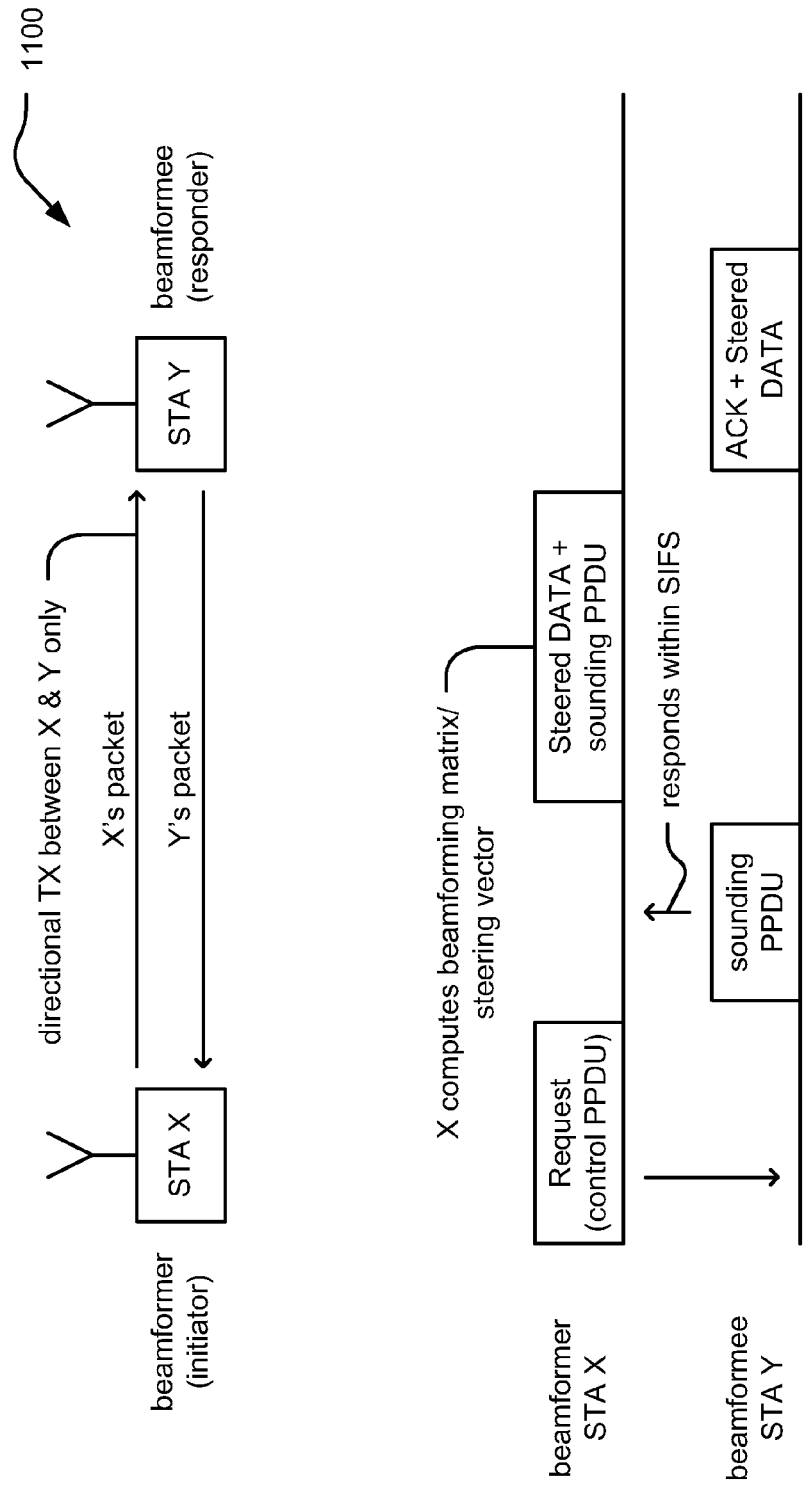
Fig. 11 (class A: bi-directional transmissions (implicit))

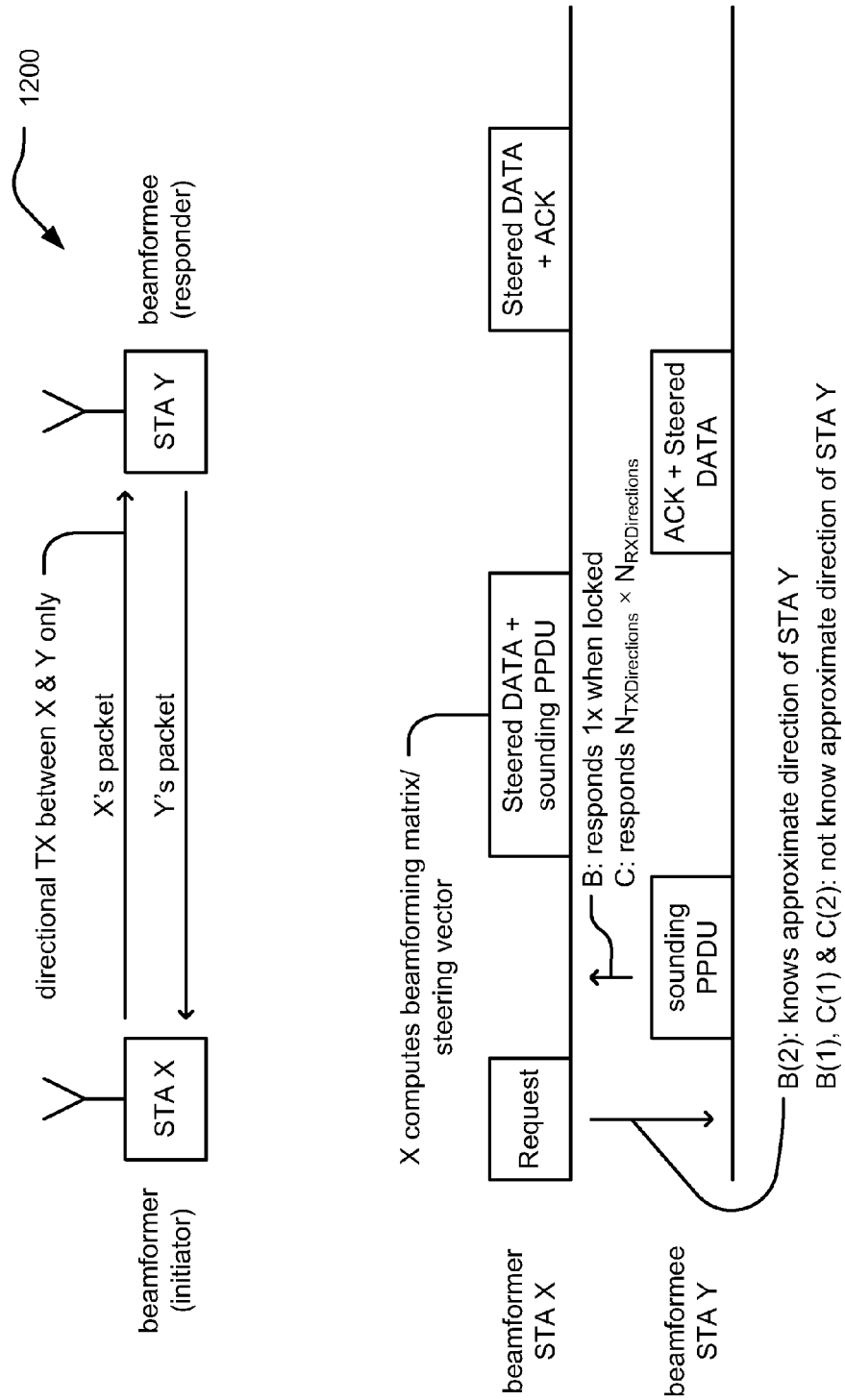
Fig. 12 (class B & C: bi-directional transmissions (implicit))

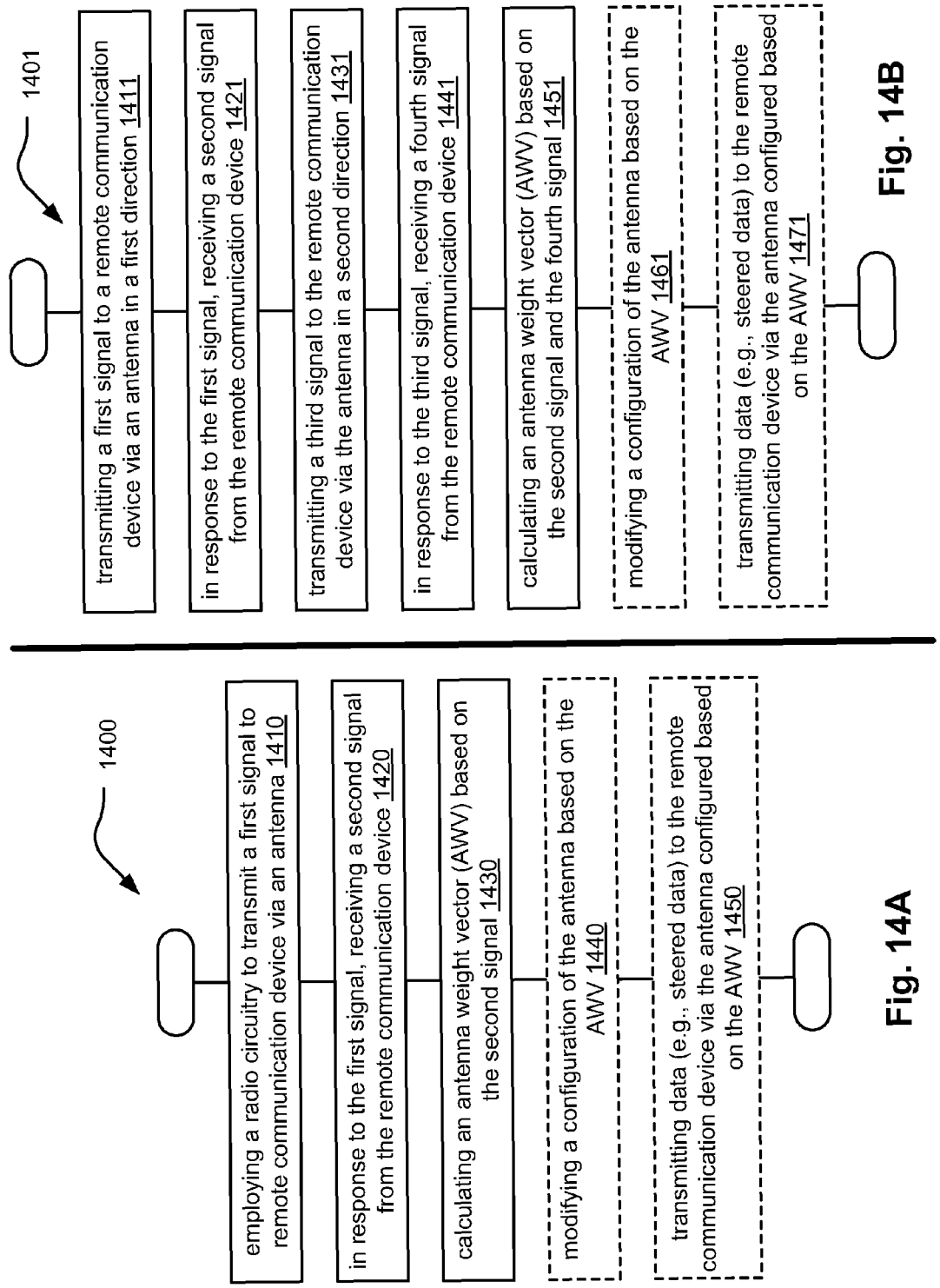

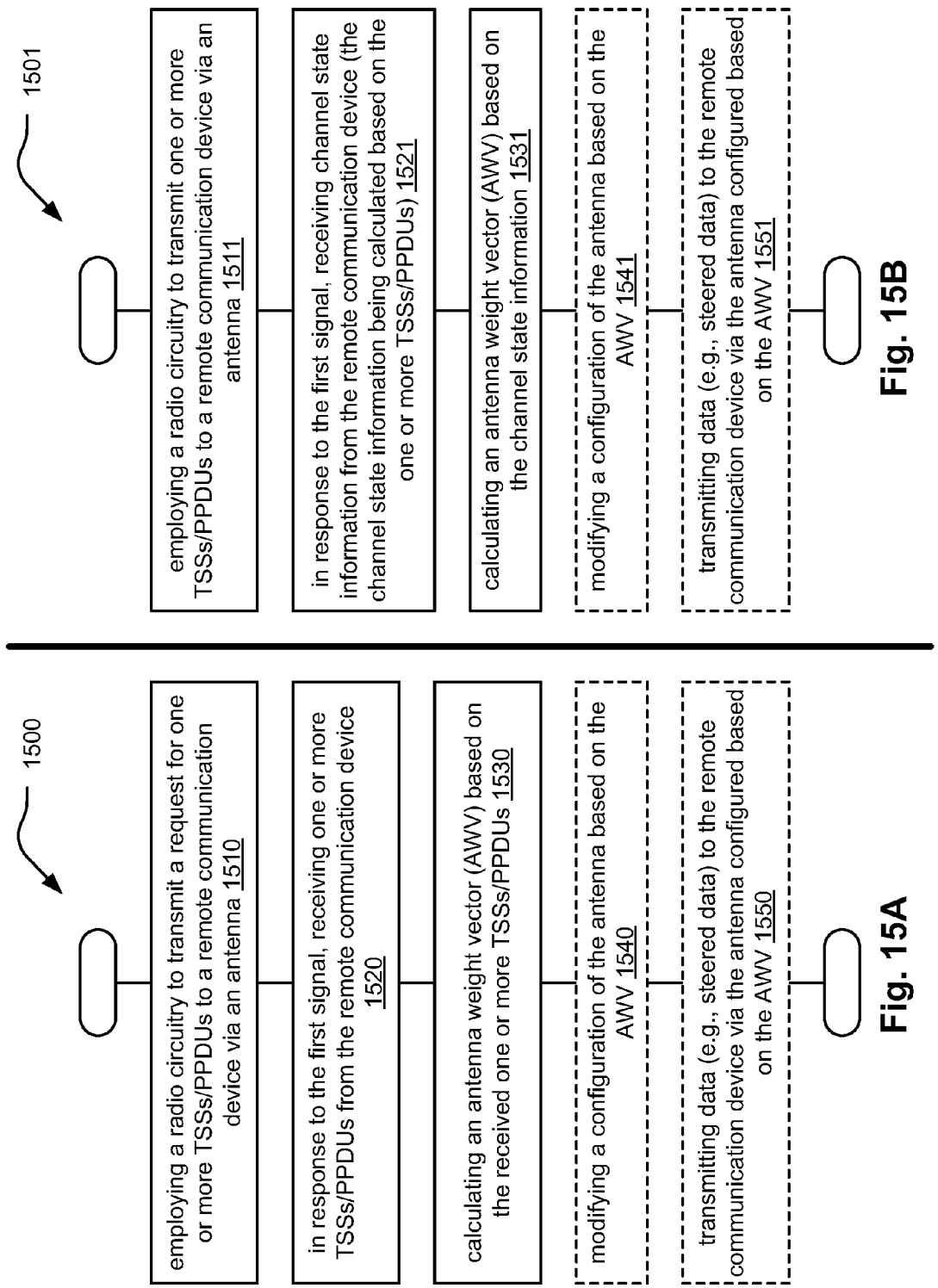

BEAMFORMING PROTOCOL FOR WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/111,681, entitled "Beamforming protocol for wireless communications," filed Nov. 5, 2008, now expired.

BACKGROUND OF THE INVENTION

1. Technical Field of the Invention

The invention relates generally to communication systems; and, more particularly, it relates to beamforming of wireless communications within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 1A is a diagram illustrating an embodiment of various forms of feedback as may be employed in accordance with beamforming.

FIG. 1B is a diagram illustrating an embodiment of various forms of directional communication devices.

FIG. 3A is a diagram illustrating an embodiment of communication devices that operate in accordance with class A.

FIG. 3B is a diagram illustrating an embodiment of communication devices that operate in accordance with class B.

FIG. 3C is a diagram illustrating an embodiment of communication devices that operate in accordance with class C.

FIG. 4 is a diagram illustrating an embodiment of a general protocol for beamforming training.

FIG. 5 is a diagram illustrating an embodiment of protocol for beamforming for class A.

FIG. 6 is a diagram illustrating an embodiment of protocol for the coarse portion of beamforming training for class B(1).

FIG. 7 is a diagram illustrating an embodiment of protocol for the coarse portion of beamforming training for class B(2).

FIG. 8 is a diagram illustrating an embodiment of protocol for beamforming training for each of class C(1) & class C(2).

FIG. 9 is a diagram illustrating an embodiment of beamforming training protocol for uni-directional transmissions in accordance with class A using implicit feedback.

FIG. 10 is a diagram illustrating an embodiment of beamforming protocol for uni-directional transmissions in accordance with each of class B & class C using implicit feedback.

FIG. 11 is a diagram illustrating an embodiment of beamforming training protocol for bi-directional transmissions in accordance with class A using implicit feedback.

FIG. 12 is a diagram illustrating an embodiment of beamforming protocol for bi-directional transmissions in accordance with each of class B & class C using implicit feedback.

FIG. 14A, FIG. 14B, FIG. 15A, and FIG. 15B are diagrams illustrating various alternative embodiments of methods for performing beamforming.

DETAILED DESCRIPTION OF THE INVENTION

Figure 2:
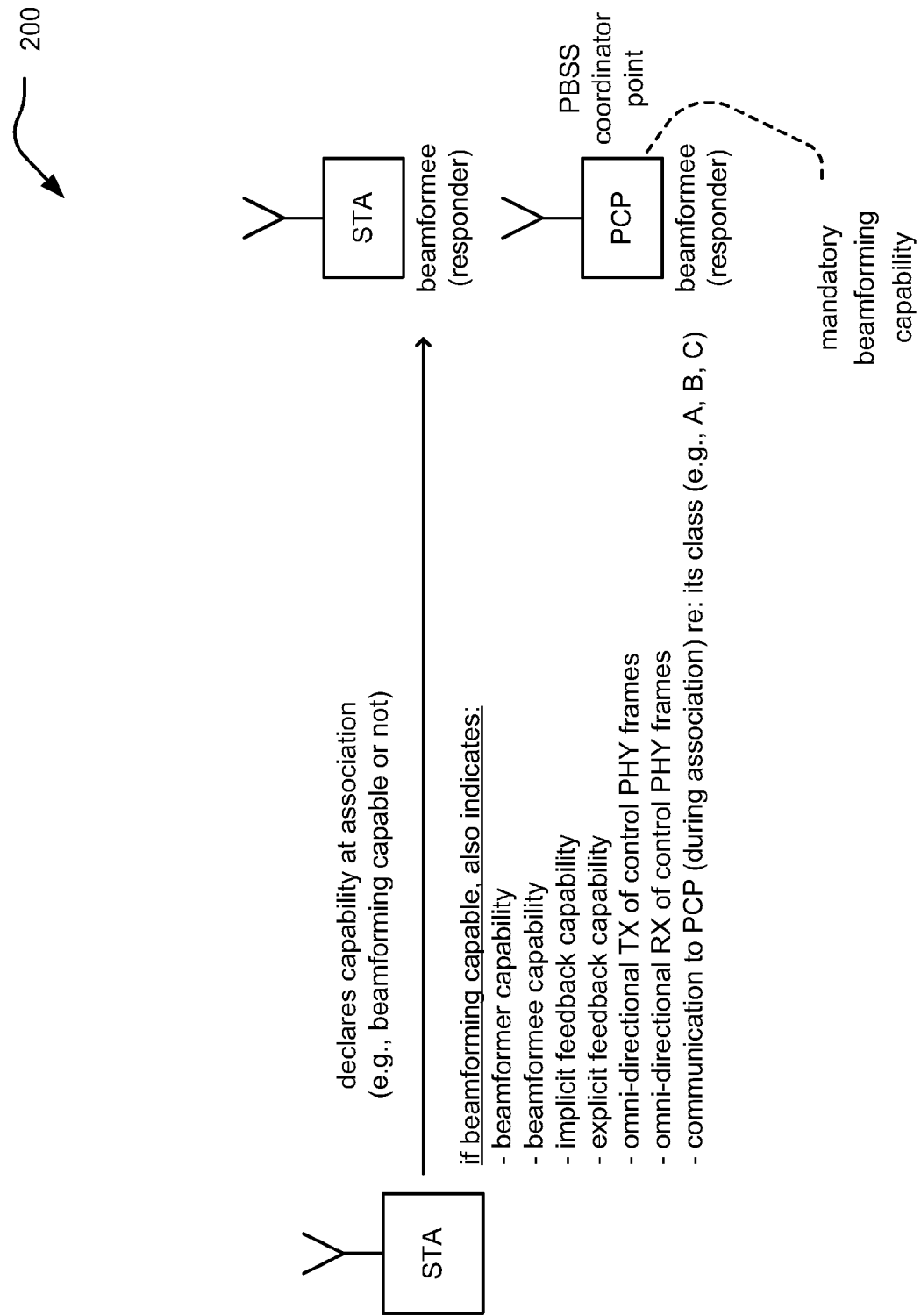
FIG. 2 is a diagram illustrating an embodiment of capability declaration as performed by a communication device.

Communication systems have been around for some time, and their presence in modern life is virtually ubiquitous (e.g., television communication systems, telecommunication systems including wired and wireless communication systems, etc.). As these communication systems continue to be developed, there is an ever present need for designing various means by which information may be encoded for transmitting from a first location to a second location.

Generally speaking, the goal of digital communications systems is to transmit digital data from one location, or subsystem, to another either error free or with an acceptably low error rate. Data may be transmitted over a variety of communications channels in a wide variety of communication systems: magnetic media, wired, wireless, fiber, copper, and other types of media as well.

There are a variety of types of communication system types and communication device types that may be implemented within such communication systems. There are a variety of communication protocols by which communications within such communication systems may be supported including the IEEE 802.15.3, IEEE 802.11 a/b/g/n, the emerging NGmS (Next Generation millimeter wave Specification) and others.

FIG. 1A is a diagram illustrating an embodiment of various forms of feedback as may be employed in accordance with beamforming 100a. This diagram shows the relationships between various communication devices within a wireless communication system that may participate within beamforming. Beamforming may generally be understood as the manner by which wireless communications are effectuated. Particularly within communication systems having individual communication devices that have multiple antennae for transmission and/or reception, the spatial selectivity is achieved by using a particular type of beam pattern (e.g., or formed electromagnetic beam). Some examples of the types of directionality of beamforming include omni-directional and directional formed beams.

Generally speaking, within many wireless communication systems, a wireless communication device may be referred to as a STA (e.g., a wireless station). Examples of wireless stations (STAs) include a wide variety of wireless communication devices (e.g., computers including laptop computers, PDAs, cell phones, etc.). In addition, various wireless communication systems can be configured and operate using different means (e.g., ad hoc, peer to peer, etc.). In some wireless communication systems, a PBSS coordinator point (PCP) [where IBSS is an independent basic services set, and where PBSS is a personal IBSS] may operate as a central governing communication device to which and through which various STAs within the wireless communication systems communicate. For example, the PCP may serve as a coordinator of various of the STAs within the wireless communication system, and it may also serve as a gateway to another network (e.g., a wide area network (WAN), the Internet, etc.). In many of the embodiments and contexts described herein, a beamformer or a beamformee may be either a STA or a PCP.

Generally speaking, a beamformer is an initiator that starts the process of beamforming for configurations of antennae (e.g., of an antenna array), signaling, beamforming training (including both coarse and fine beamforming training therein), etc. for subsequent communications between 2 communication devices. A beamformee is the responder to the beamformer and interacts, at least in part, with the beamformer to effectuate beamforming for communications there between.

There are different types of feedback that can be effectuated to assist within the beamforming including implicit and explicit. Generally speaking, implicit feedback is effectuated when the beamformee transmits training sequence symbols (TSS)/sounding packets (e.g., packets used by the recipient to measure the channel) back to the beamformer that will be used by a beamformer to determine the antenna weight vector (AWV). The AWV governs the various weights associated with each individual antenna, or individual components of a multi-component antenna, to be configured for transmission (and/or reception) of subsequent frames, for example the data-bearing frames (DATA frames) that are passed between the two STAs. AWV values may be modified using newly acquired feedback at regular or irregular intervals. The process of determining AWV values may generally be referred to as beamforming training.

Generally speaking, explicit feedback is effectuated when the beamformer sends the TSS/sounding packets to the beamformee. The beamformee then uses these received TSS/sounding packets to calculate channel state information and then the beamformee relays this channel state information back to the beamformer. The beamformer then uses this channel state information to determine the antenna weight vector (AWV), which again is used to govern the various weights associated with each individual antenna, or individual components of a multi-component antenna, to be configured for transmission (and/or reception) of subsequent frames, for example the data-bearing frames (DATA frames) that are passed between the two STAs. AWV values may be modified using newly acquired feedback at regular or irregular intervals. Independent of whether implicit or explicit feedback is used, the process of determining AWV values may generally be referred to as beamforming training.

FIG. 1B is a diagram illustrating an embodiment of various forms of beamforming as may be performed for different types of directional communication devices 100b. Different types of communication maybe effectuated between various wireless communication devices including uni-directional or bi-directional. Simply put, uni-directional communications are in only one direction between a first communication device and a second communication device (e.g., from first to second only or from second to first only). Bi-directional communications are in both directions between a first communication device and a second communication device.

This diagram shows how a communication device may be implemented to effectuate beamforming with respect to one or both of uni-directional communications or bi-directional communications one communication device (e.g., a local or originating communication device) and at least one communication device (e.g., a remote communication device). Various communication systems may include multiple communication devices therein (e.g., STAs, PCPs, etc.).

In either of the embodiments, control and configuration related communications may be performed bi-directionally between the two communication devices to effectuate the beamforming for subsequent data communications there between. In other words, there may be certain bi-directional related control and configuration related communications performed to configure one or both of the communication devices at the respective ends of a communication link to set up the respective antenna weight vector (AWV) or AWVs thereof.

The communication device includes an antenna (which may be a singular antenna, multiple antennae, or an antenna array) by which communications are transmitted from and received by the communication device. The radio circuitry is coupled to the antenna, and the radio circuitry is operative to transmit one or more signals to at least one additional communication device (e.g., a remote communication device) via the antenna.

In one embodiment, a first signal indicates a beamforming capability that includes a transmit functionality and a receive functionality corresponding to the communication device, and the first signal is transmitted in accordance with the transmit functionality corresponding to the communication device. The first signal is transmitted using the inherent transmit functionality of the communication device. In some embodiments, the communication device may be able to transmit both omni-directionally and directionally, and as such, the transmission of signals therefrom may be either omni-directionally or directionally (or alternatively, both omni-directionally and directionally).

The antenna weight vector circuitry, that is coupled to the radio circuitry, is operative to calculate an antenna weight vector (AWV) based on a second signal received from the at least one additional communication device. This second signal is sent to the communication device in response to the first signal. The antenna is then configured based on the calculated/determined AWV. The radio circuitry is then operative to transmit data to the at least one additional communication device via the antenna that is configured based on the AWV.

In certain embodiments, the second signal indicates a beamforming capability that includes a transmit functionality and a receive functionality corresponding to the communication device to which the original communications are sent (e.g., a remote communication device). The antenna weight vector circuitry is then operative to calculate the AWV based on the transmit functionality corresponding to the communication device and the receive functionality corresponding to the at least one additional communication device. This way, the subsequent communications transmitted from the first or originating communication device may be steered and appropriately tailored to the transmit functionality of the first or originating communication device and the receive functionality of the second or remote communication device.

Various embodiments are presented herein in which implicit or explicit feedback may be performed to effectuate the beamforming of communications (e.g., data communications) between a first communication device and a second communication device. In addition, various instructions in regards to collision rules are presented (such as dealing with the instances when packets may be lost in transmission between the respective communication devices).

FIG. 2 is a diagram illustrating an embodiment of capability declaration as performed by a communication device 200. When beamforming is employed, a first device (e.g., a STA) will declare its capabilities during its attempted association with a wireless communication system and particularly when beginning to attempt communications with another communication device therein. At a minimum, the beamforming capability of the device is declared during its association. Not all communication devices (e.g., not all STAs) will necessarily include a capability to perform beamforming. However, beamforming capability is typical for a PCP, and is mandatory in some embodiments.

If a communication device is in fact capable of performing beamforming, then it will also declare whether it has any of the following capabilities:

1. beamformer capability
2. beamformee capability
3. implicit feedback capability
4. explicit feedback capability
5. omni-directional transmission capability of control physical layer (PHY) frames (e.g., very robust, low rate frames having high channel gains, transmitted with antenna configured to have wider beam widths, etc. to facilitate easier demodulation/decoding by a large number of receiving communication devices)
6. omni-directional reception capability of control PHY frames
   a. of omni-directional is declared, this will indicate that the control PHY will transmit one time (1×) and cover an omni-type are
7. class (e.g., A, B, or C as described later) to the PCP
   a. all devices will ascertain or already know the capability when the PCP announces the devices in the PBSS, their respective class, capabilities, etc. periodically in the beacon there from
   b. also, the PCP may announce at times when a new device joins or leaves the system periodically or on every beacon The different types of classes (e.g., A, B, or C) are described in the following diagrams. Within any given wireless communication system, not all of the communication devices therein will have common beamforming capabilities. Depending on the type of communication device of interest, different embodiments of beamforming may be performed.

FIG. 3A is a diagram illustrating an embodiment of communication devices that operate in accordance with class A 300a. Communication devices of this class are capable of performing omni-directional transmission and omni-directional reception of the control PHY therein. In other words, the communication devices in this embodiment each have capability to transmit signals and to receive signals in any direction.

FIG. 3B is a diagram illustrating an embodiment of communication devices that operate in accordance with class B 300b. Communication devices of this class are capable of performing directional transmission but omni-directional reception only of the control PHY therein. In other words, the communication devices in this embodiment each have capability to transmit signals directionally and to receive signals transmitted to it from any direction.

FIG. 3C is a diagram illustrating an embodiment of communication devices that operate in accordance with class C 300c. Communication devices of this class are capable of performing directional transmission and directional reception only, of the control PHY. In other words, the communication devices in this embodiment each have capability to transmit signals directionally and to receive signals transmitted to it from only a particular direction (e.g., directionally transmitted to it).

When considering each of these various classes A, B, and C, depending on the class to which a particular communication device belongs, that particular device will be able to transmit all of the various types of signals in accordance with that class' mode. For example, a class A communication device will be able to transmit control PHY frames, sounding physical layer (PHY) protocol data unit (PPDU) (e.g., sounding PPDU) frames, management frames, etc. using the capabilities of and in accordance with the operational parameters of the class A to which it belongs.

As can be seen from this diagram, a class A communication device is also capable of operating in accordance with class B and class C, and a class B communication device is also capable of operating in accordance with class C.

Certain embodiments envision only operating in accordance with class A and class B as described above. This means that the receive side of a beamforming operation that employs this embodiment should always be omni-receivable capable, and the first signaling stage has only one frame to transmit and one frame to receive.

Operation in accordance with a quasi-omni receive mode is as follows:

As the transmit sector sweep is executed without prior knowledge about the peer's direction, the receiving station (while at this stage) is expected to be operating in a quasi-omni mode in which it must be able to receive from all directions that are potential for a beam formed link.

However, there might be some STAs in PBSS that can only listen in certain directions and the initial beamforming protocol must be able to recognize this situation, which it does through the capability bit of the beamformee obtained from the PCP or the STA.

FIG. 4 is a diagram illustrating an embodiment of a general protocol for beamforming training 400. Generally speaking, a sounding PPDU is transmitted from a communication device (e.g., STA) as a function of that STA's capability. The sounding PPDU is transmitted accordingly depending on the STA's capability of omni TX (class A&B) or directional TX (class C). In an explicit beamforming training procedure, the receiver of the sounding frame responds at some point with a returned frame (e.g., a feedback frame). As also described above, various types of feedback may be employed including either implicit feedback (e.g., where a sounding frame is returned) or explicit feedback (e.g., where a frame containing actual channel state information is returned).

It is also noted that the beamforming training can happen anywhere in the superframe when communication between the two STAs is permitted. For example, the beamforming training can occur during the Beamforming Training Time (BFTT) period wherein a STA (which may or may not be a PCP) initiates beamforming training using the contention access rules applicable to PCP and other STAs.

Alternatively, beamforming training between a PCP and a STA can occur during channel time allocation (CTA) periods allocated by the PCP in which the STA is indicated as source or destination of the CTA and in which the STA is ready to do so. In this case, the overhead of regularly-occurring or irregularly-occurring beamforming training operations may be included by the PCP in the overall determination of the allocation of CTAs for normal data traffic that is expected to be transferred between the STA and the PCP during that set of CTAs. The CTA periods may be allocated for one time appearance and use, or may be allocated to recur at a regular interval for some period of time, e.g., pseudo-static CTAs.

In even another alternative embodiment, the beamforming can be performed in a regular (e.g. non-BFTT period) contention access period (CAP) using regular rules and in A-BFT for new STAs that intend to do beamforming prior to association. It may be recommended for best practices that in this case the beamforming be restricted between a STA and the PCP so as not to waste wireless resource if the destination STA is in sleep mode.

FIG. 5 is a diagram illustrating an embodiment of protocol for beamforming for class A 500. In this embodiment, the control PHY is transmitted and received omni-directionally. It is noted to the reader that omni-directional transmission and reception is different and distinct from omni-coverage.

Collisions/frame errors are treated as follows. In these illustrative examples, the STA X is the beamformer and STA Y is the beamformee.

Consider the Situation Where X's Packet is Lost:

In CAP, BFTT, & Association Beamform Training (A-BFT), the beamforming training protocol STA X and STA Y follow the usual contention access rules defined for CSMA/CA, within, for example IEEE 802.15.3 or IEEE 802.11. Moreover, in the case of collisions at an intended receiver, the beamforming protocol STA Y follows the EIFS rules for the receiver as found in IEEE 802.11, for example.

In CTA/pseudo static CTA, the beamforming training protocol transmitting STA X waits for a timeout and the timeout is defined as:

SIFS+return packet time, where return packet time is the time needed to transmit the packet that STA Y is expected to transmit in response to the packet transmitted by STA X. A return packet may contain ACK information plus sounding, or it may contain ACK information plus feedback as described earlier, or it may contain only ACK information, in which case the feedback information must be sent at a later time.

Consider the Situation Where Y's Packet is Lost:

In CAP, BFTT & A-BFT, the beamforming training protocol STA X and STA Y follow the usual contention access rules defined for CSMA/CA, in particular, STA X waits for ACK (or return packet) timeout duration before attempting a retransmission if the current superframe timing condition still allows it, where ACK timeout is the time needed to transmit an ACK packet that STA Y is expected to transmit in response to the packet transmitted by STA X.

In CTA/pseudo static CTA, the beamforming training protocol transmitter STA X again waits for an ACK (or return packet) timeout. In this case, the return packet may be a steered/unsteered sounding (PHY Protocol Data Unit) PPDU.

The above collision rules are the same for all classes of devices (e.g., A, B, and C) with minor changes to what sequence of frames are transmitted during the beamforming training protocol exchange.

FIG. 6 is a diagram illustrating an embodiment of protocol for the coarse portion of beamforming training for class B(1) 600. In this embodiment, the control PHY is transmitted directionally and received omni-directionally. There are 2 separate cases dealt with below: scheme B(1) and scheme B(2).

Scheme B(1):

In scheme B(1), the beamformer does not know the approximate direction of the beamformee. Each directional sounding PPDU is followed by SIFS+return packet (or ACK) if the receiver (beamformee) receives it. Since this is a coarse training procedure, it stops after reception of a packet that was transmitted by the beamformee to the beamformer, and the direction of the transmission that produced this response and the subsequently generated AWV correspond to a first beam.

An alternative is to continue sending sounding packets (sounding PPDUs) after receiving a packet transmitted in response by the beamformee in order to determine the AWV in other directions also. This reduces the fine training duration.

The total maximum duration of the sequence (cycle time) of this scheme is as follows:

$$T_{CycleTime} = N_{Directions} \times T_{SoundingPPDUTime} + (N_{Directions} - 1) \times T_{SwitchTime} + (N_{Directions}+1) \times T_{SIFS} + T_{ACK}$$

The value of the Duration field (NAV) for each packet is: $T_{CycleTime} - (T_{PacketStartTime} - T_{PacketDuration})$, where $T_{PacketStartTime}$ is the time elapsed from the beginning of the sequence until the start of the transmission of this packet and $T_{PacketDuration}$ is the amount of time needed to transmit this packet.

FIG. 7 is a diagram illustrating an embodiment of protocol for the coarse portion of beamforming training for class B(2) 700.

Scheme B(2):

In scheme B(2), the beamformer does know the approximate direction of the beamformee (e.g., same as for class A). In this embodiment, the beamformer transmits a directional sounding PPDU in all directions first and then waits for the ACK (or return packet) from the beamformee (i.e., responder/receiver) after SIFS. Each sounding PPDU contains the time when the last sounding PPDU transmission ends, and the beamformee can use that information and respond after SIFS, independently of whether or not the beamformee actually received the last sounding PPDU that was transmitted. The response transmission may or may not contain an identification of the sounding PPDU to which the beamformee is responding, and the direction of that sounding PPDU and the accompanying AWV that is eventually generated (after examination of the feedback information) correspond to a first beam. In addition, in the case of non reception of ACK for the entire cycle, the beamforming training protocol follows the same collision rules as described in the discussion of FIG. 5 for class A STAs.

The cycle time of this scheme is as follows:

$$T_{CycleTime} = N_{Directions} \times T_{SoundingPPDUTime} + (N_{Directions} - 1) \times T_{SwitchTime} + T_{SIFS} + T_{ACK}$$

The value of the Duration field (NAV duration) for each packet is: $T_{CycleTime} - (T_{PacketStartTime} - T_{PacketDuration})$, where $T_{PacketStartTime}$ is the time elapsed from the beginning of the sequence until the start of the transmission of this packet and $T_{PacketDuration}$ is the amount of time needed to transmit this packet.

Tradeoffs of the Two Previous Schemes: B(1) & B(2)

The first scheme, B(1), introduces gaps after each sounding PPDU transmission. The worst case scenario of B(1) is that the response comes at the last sounding PPDU. Also, if all directions are equally likely, then the average total time required is as follows:

$T_{CycleTime}/2$

In comparison, the second scheme, B(2), does not introduce any gaps between sounding PPDU transmissions, so the response time is the same as the cycle time Tradeoff Considerations Two components may be considered and weighed against each another:

(1) the probability or odds of getting a response in scheme B(1) vs. (2) not having gaps in the second scheme B(2). A designer may choose one of the schemes that is most appropriate for a particular application.

It is also noted that if the Tx/Rx wants to determine a second beam (i.e. the second best beam), third best beam, and so on, for wireless communications in case their first beam (i.e. primary beam) is blocked (because of shadowing or mobility), then it may be desirable simply to employ scheme B(2) to characterize the channel in all directions so that such alternative second and third, etc. beams will be known in advance of the perceived need to employ them.

FIG. 8 is a diagram illustrating an embodiment of protocol for beamforming training for each of class C(1) & class C(2) 800. In class C, the control PHY is transmitted and received directionally.

There are 2 separate cases dealt with below: scheme C(1) and scheme C(2).

Scheme C(1):

In the scheme C(1), the beamformer does not know the approximate direction of beamformee.

In this embodiment, the beamformer, X, sends a control packet (Request) to a PCP indicating its desire to effectuate beamforming with beamformee, Y.

The PCP in turn initiates a control packet (BFE (Beaformee) directional communication packet) indicating to the beamformee Y the number of times the beamformer X will transmit the sounding packet (to have omni coverage). This PCP transmission includes a value in the Duration field that creates a NAV in receivers to protect the period of time during which the beamforming training protocol transmissions occur. That is to say, the Duration field (NAV duration) of the PCP control packet contains a value that is at least as large as the sum of the necessary interframe spacings plus the transmission times of the beamformee's response packet plus the PCP's transmission to the beamformer (see next sentence) and the number of expected beamform training transmissions which is determined based on the number of times the beamformer X will transmit sounding packets and the number of receiving directions of the beamformee (see next sentence).

The beamformee Y then responds with a number of receiving directions which also functions as an acknowledgement of the PCP transmission. Similarly, the PCP sends a control packet to the beamformer X indicating the number of directions for which the receiver will listen. An alternative is for the PCP to multicast the frame to both the beamformer X and beamformee Y so that NAV and number of transmit and receive directions are all communicated simultaneously. In this case, the PCP obtains knowledge of the number of transmit directions from the beamformer and the number of receive directions from the beamformee at an earlier time, such as at association time. Additionally, if the beamformer X and beamformee Y know and learn about each other's capabilities because of the earlier broadcast from the PCP, the beamformer X only needs to transmit a beamform training start indication to the PCP which then transmits a frame to the beamformee Y to indicate the start of the beamforming training process. Beamformee Y responds with an ACK.

The time from the beginning of the sequence above until the transmission of the last frame described above is called setup time: $T_{Setup}$.

The beamforming training continues with the commencement of the transmission of sounding PPDUs by the beamformer SIFS time after the transmission of the ACK from X that is in response to the PCP transmission of the beamformee number of receive directions, or SIFS time after the transmission of the ACK from Y that is in response to the PCP transmission of the beamformer start indication, or SIFS time after the PCP transmission of the broadcast indication frame, depending on which sequence was employed. The PCP sets the NAV on behalf of the beamformer and beamformee as is shown in the diagram.

Scheme C(2):

In the scheme C(2), the beamformer knows the approximate direction of beamformee.

Each directional sounding PPDU is followed by SIFS+ return packet (or ACK) if the receiver receives it. Since this is a coarse training procedure, the sequence stops after reception of a packet from the beamformee. Alternatively, the sequence can continue until the training is done in all directions.

The above process is repeated for each direction in which the receiver can receive.

The cycle time of these 2 respective schemes are as follows:

Scheme C(1):

$$C(1): T_{CycleTime} = T_{Setup} + N_{TXDirections} \times N_{RXDirections} \times T_{SoundingPPDUTime} + (N_{TXDirections} \times N_{RXDirections} + 1) \times T_{SIFS} + T_{ACK}$$

Scheme C(2):

$$C(2): T_{CycleTime} = T_{Setup} + N_{TXDirections} \times N_{RXDirections} \times T_{SoundingPPDUTime} + 2 \times (N_{TXDirections} \times N_{RXDirections} - 1) \times T_{SwitchTime} + T_{SIFS} + (N_{TXDirections} \times N_{RXDirections} \times T_{ACK})$$

It is noted that the beamformee Y may have to send the return packet or ACK $N_{Direction}$ times in order for the beamformer X to receive it in case of scheme C(2) since the beamformee Y does not know where the beamformer X exists. This is because the roles are now reversed and the intended receiver (the beamformee) does not know which direction to tune for the transmitter (the beamformer).

It is noted that the beamformee Y can transmit the direction from which it received the beamformer X's sounding packet to the PCP which in turn can communicate this information to beamformer X, in which case, the scheme C(2) equation reduces to the following:

$$C(2): T_{CycleTime} = T_{Setup} + N_{TXDirections} \times N_{RXDirections} \times T_{SoundingPPDUTime} + 2 \times (N_{TXDirections} \times N_{RXDirections} - 1) T_{SwitchTime} + T_{SIFS} + T_{ACK} + T_{SIFS} + T_{ACK}$$

Collisions are handled in the same manner as outlined above with respect to class A (e.g., the reader is referred to FIG. 5 discussion) with the only difference being the cycle time, which is provided above.

FIG. 9 is a diagram illustrating an embodiment of beamforming training protocol for uni-directional transmissions in accordance with class A using implicit feedback 900. In this exemplary embodiment, it is assumed that directional transmissions using AWV are employed in transmission from beamformer X to beamformee Y only and not from beamformee Y to beamformer X.

In this embodiment, the STA beamformer X initiates a control PPDU transmission to STA Y requesting implicit beamforming training. Then, the beamformee STA Y responds in SIFS time with a sounding PPDU. The STA beamformer X then computes the beamforming matrix/steering vector (i.e., the antenna weight vector (AWV)) from the sounding PPDU.

FIG. 10 is a diagram illustrating an embodiment of a beamforming protocol for uni-directional transmissions in accordance with each of class B & class C using implicit feedback 1000. The STA beamformer X initiates transmission of a control PPDU to beamformee STA Y requesting implicit beamforming training as per the beamforming protocol outlined above, using the knowledge of whether it knows the approximate direction of the intended beamformee or not. The beamformee STA Y then responds with one sounding PPDU transmission for the case of scheme B and it responds with $N_{TXDirections} \times N_{RXDirections}$ sounding PPDU transmissions for the case of scheme C. The STA beamformer X, upon reception of the sounding PPDU(s), computes the beamforming matrix/steering vector (AWV) and then employs the AWV in subsequent data transmissions (steered data packet transmissions) to the beamformee STA Y.

FIG. 11 is a diagram illustrating an embodiment of beamforming training protocol for bi-directional transmissions in accordance with class A using implicit feedback 1100. In this exemplary embodiment, it is assumed that directional transmissions using AWV are employed in transmission from beamformer X to beamformee Y and from beamformee Y to beamformer X. In this case, STA X and STA Y will both take both roles as beamformer and beamformee.

In this embodiment, the beamformer STA X initiates transmission to beamformee STA Y of a control PPDU requesting implicit beamforming training. The beamformee STA Y responds in SIFS time with a sounding PPDU transmission. The beamformer STA X computes the beamforming matrix/ steering vector (AWV) from the received sounding PPDU and then transmits a steered Data PPDU that is also a sounding PPDU. STA Y computes an AWV from the received sounding PPDU and responds with a transmission that contains an ACK to the steered DATA plus steered data intended for reception by STA X.

FIG. 12 is a diagram illustrating an embodiment of beamforming protocol for bi-directional transmissions in accordance with each of class B & class C using implicit feedback 1200.

In this embodiment, the beamformer STA X initiates transmission to beamformee STA Y of a control PPDU requesting implicit beamforming training as per the protocol outlined using the knowledge of whether it knows the approximate direction of the intended beamformee Y or not.

The beamformee STA Y then responds with the transmission of one sounding PPDU for the case of scheme B and it responds with the transmission of $N_{TXDirections} \times N_{RXDirections}$ for the case of scheme C. The beamformer STA X, upon reception of the sounding PPDU, computes the beamforming matrix/steering vector from the received sounding PPDU and then transmits a steered Data PPDU that is also a sounding PPDU. STA Y computes an AWV from the received sounding PPDU and responds with a transmission that contains an ACK to the steered DATA plus steered data intended for reception by STA X.

As described herein, a beamforming protocol is provided that considers all types of devices (e.g., class A, B, and C) and all possible ways to do beamforming there between. Moreover, when collisions occur, different rules and ways to deal with such collisions are presented.

Figure 13:
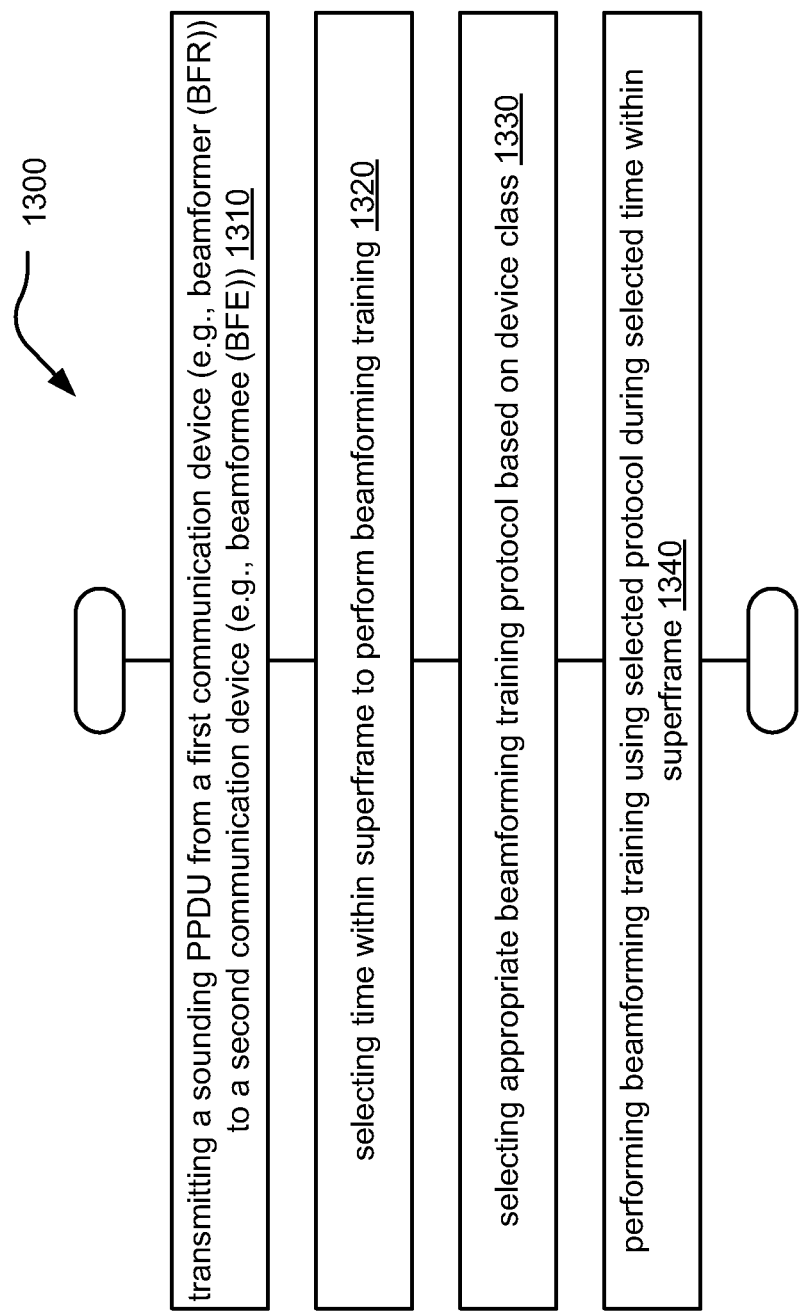
FIG. 13 is a diagram illustrating an embodiment of a method for performing beamforming training.

FIG. 13 is a diagram illustrating an embodiment of a method for performing beamforming training 1300. The method 1300 begins by transmitting a sounding PPDU from a first communication device (e.g., beamformer (BFR)) to a second communication device (e.g., beamformee (BFE)), as shown in a block 1310. This transmitted PPDU may also include information corresponding to the transmitting device's capabilities (e.g., whether it has beamformer capability, beamformee capability, implicit feedback capability, explicit feedback capability, omni-directional control capability, directional control capability, etc.)

The method 1300 then continues, as shown in a block 1320, by selecting a time within a superframe to perform beamforming training. As described above in other embodiments, the beamforming training can be performed within any of a number of different times within a superframe (e.g., during BFTT, during a regular contention access period, during channel time allocation slots allocated by a PCP or a STA itself, etc.).

The method 1300 then operates, as shown in a block 1330, by selecting an appropriate beamforming training protocol based on the device class (e.g., either one or both of the beamformer and beamformee class).

Once the particular beamforming training protocol and time during which beamforming training is to be performed are selected, the method 1300 operates by performing beamforming training using those selected parameters, as shown in a block 1340.

FIG. 14A, FIG. 14B, FIG. 15A, and FIG. 15B are diagrams illustrating various alternative embodiments of methods for performing beamforming.

Referring to method 1400 of FIG. 14A, the method 1400 begins by employing a radio circuitry to transmit a first signal to remote communication device via an antenna, as shown in a block 1410. Such a signal may itself be a PPDU, or it may alternatively be a request for a PPDU to be transmitted back from the remote communication device to the originating communication device.

In response to the first signal, the method 1400 continues by receiving a second signal from the remote communication device, as shown in a block 1420. This second signal may be a PPDU that is transmitted back from the remote communication device to the originating communication device. In alternative embodiments, the channel state information is calculated by the remote communication device, and that channel state information is then transmitted back to the originating communication device. The method 1400 then operates by calculating an antenna weight vector (AWV) based on the second signal, as shown in a block 1430.

Once the AWV is calculated/determined, then the method 1400 may perform any number of steps including updating or modifying the AWV for use in subsequent data transmissions to the remote communication device. Once the antenna is configured by the AWV, then the subsequent data transmissions may be viewed as being steered.

In some embodiments, the method 1400 continues by modifying a configuration of the antenna based on the AWV, as shown in a block 1440. The method 1400 then operates by transmitting data (e.g., steered data) to the remote communication device via the antenna configured based on the AWV, as shown in a block 1450.

Referring to method 1401 of FIG. 14B, the method 1401 begins by transmitting a first signal to a remote communication device via an antenna in a first direction, as shown in a block 1411. In response to the first signal, the method 1401 then operates by receiving a second signal from the remote communication device, as shown in a block 1421.

The method 1401 continues by transmitting a third signal to the remote communication device via the antenna in a second direction, as shown in a block 1431. In response to the third signal, the method 1401 then operates by receiving a fourth signal from the remote communication device, as shown in a block 1441. These operations may be viewed as directionally transmitting signals in a number of directions as may be performed by a communication device having directional transmit capability.

The method 1401 continues by calculating an antenna weight vector (AWV) based on the second signal and the fourth signal, as shown in a block 1451. In other words, this calculating of the AWV is performed based on and considering both the second signal and the fourth signal, that are provided in response to the directional signals transmitted from the communication device in the first and second directions.

Of course, it is noted that more than two signals may be transmitted respectively in more than two directions as well. For example, in some embodiments, different respective signals may be transmitted in each of the directions in which the communication device is capable of transmitting directionally. As may be seen, there are multiple variations that may be implemented by design choice (e.g., transmitting different signals in a given direction, transmitting different signals in different directions, receiving signals transmitted from a given direction, receiving signals transmitted from multiple different directions).

As with other embodiments, once the AWV is calculated/determined, then the method 1500 may perform any number of steps including updating or modifying the AWV for use in subsequent data transmissions to the remote communication device. Once the antenna is configured by the AWV, then the subsequent data transmissions may be viewed as being steered.

In some embodiments, the method 1401 then operates by modifying a configuration of the antenna based on the AWV, as shown in a block 1461. The method 1401 continues by transmitting data (e.g., steered data) to the remote communication device via the antenna configured based on the AWV, as shown in a block 1471.

Referring to method 1500 of FIG. 15A, the method 1500 begins by employing a radio circuitry to transmit a request for one or more TSSs/PPDUs to a remote communication device via an antenna, as shown in a block 1510. In response to the first signal, the method 1500 continues by receiving one or more TSSs/PPDUs from the remote communication device, as shown in a block 1520. The method 1500 then operates by calculating an antenna weight vector (AWV) based on the received one or more TSSs/PPDUs, as shown in a block 1530.

In some embodiments, the method 1500 then operates by modifying a configuration of the antenna based on the AWV, as shown in a block 1461. The method 1401 continues by transmitting data (e.g., steered data) to the remote communication device via the antenna configured based on the AWV, as shown in a block 1471.

The method 1500 continues by modifying a configuration of the antenna based on the AWV, as shown in a block 1540.

The method 1500 continues by transmitting data (e.g., steered data) to the remote communication device via the antenna configured based on the AWV, as shown in a block 1550.

Referring to method 1501 of FIG. 15B, the method 1501 begins by employing a radio circuitry to transmit one or more TSSs/PPDUs to a remote communication device via an antenna, as shown in a block 1511. In response to the first signal, the method 1501 then operates by receiving channel state information from the remote communication device (the channel state information being calculated based on the one or more TSSs/PPDUs), as shown in a block 1521. The method 1501 continues by calculating an antenna weight vector (AWV) based on the channel state information, as shown in a block 1531.

In some embodiments, the method 1501 then operates by modifying a configuration of the antenna based on the AWV, as shown in a block 1461. The method 1401 continues by transmitting data (e.g., steered data) to the remote communication device via the antenna configured based on the AWV, as shown in a block 1471.

The method 1501 then operates by modifying a configuration of the antenna based on the AWV, as shown in a block 1541. The method 1500 continues by transmitting data (e.g., steered data) to the remote communication device via the antenna configured based on the AWV, as shown in a block 1551.

It is noted that the various modules (e.g., transmitter modules and/or circuitries, receiver modules and/or circuitries, any apparatus or component thereof, etc.)

described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication device, comprising: an antenna; a radio circuitry, coupled to the antenna, that is operative to transmit a first signal to establish beamforming during a period initiated under at least one of a contention access period and a channel time allocation period to at least one additional communication device via the antenna using a beamforming training protocol based on a device class of the communication device and/or the at least one additional communication device, the first signal indicating a beamforming capability that declares a transmit functionality and a receive functionality corresponding to the communication device, the first signal for establishing a configuration of the antenna based at least in part on a common beamforming capability with the at least one additional communication device; and the first signal is transmitted in accordance with the transmit functionality corresponding to the communication device; and an antenna weight vector circuitry, coupled to the radio circuitry, that is operative to calculate an antenna weight vector (AWV) based on the transmit functionality corresponding to the communication device and on a second signal, responsive to the first signal, received from the at least one additional communication device, the second signal indicating a beamforming capability that includes a receive functionality corresponding to the at least one additional communication device; the configuration of the antenna modified based on the AWV; and the radio circuitry is operative to transmit data to the at least one additional communication device via the antenna modified based on the AWV.

2. The communication device of claim 1, wherein:
the radio circuitry is operative to transmit the first signal via the antenna in a first direction; and
the radio circuitry is operative to transmit a third signal via the antenna in a second direction;
the radio circuitry is operative to receive a fourth signal, responsive to the third signal, from the at least one additional communication device; and
the antenna weight vector circuitry is operative to update the AWV based on the fourth signal.

3. The communication device of claim 1, wherein:
the transmit functionality and the receive functionality corresponding to the communication device are omni-directional;
the transmit functionality corresponding to the communication device is directional and the receive functionality of the communication device is omni-directional; or the transmit functionality and the receive functionality corresponding to the communication device are directional.

4. The communication device of claim 1, wherein:
the transmit functionality and the receive functionality corresponding to the at least one additional communication device are omni-directional;
the transmit functionality corresponding to the at least one additional communication device is directional and the receive functionality corresponding to the at least one additional communication device is omni-directional; or
the transmit functionality and the receive functionality corresponding to the at least one additional communication device are directional.

5. The communication device of claim 1, wherein:
the second signal includes a steered or unsteered sounding physical layer (PHY) protocol data unit (PPDU).

6. The communication device of claim 1, wherein:
the first signal includes a sounding physical layer (PHY) protocol data unit (PPDU); and
the second signal includes a plurality of training sequence symbols (TSS).

7. The communication device of claim 1, wherein: the first signal includes a sounding physical layer (PHY) protocol data unit (PPDU); and the second signal includes a channel state information as calculated by the at least one additional communication device based on the sounding PHY PPDU.

8. The communication device of claim 1, wherein:
the communication device is a wireless station (STA); and
the at least one additional communication device is a personal independent basis services set coordinator point (PCP).

9. The communication device of claim 1, wherein:
the communication device is a personal independent basis services set coordinator point (PCP);
the at least one additional communication device is a wireless station (STA);
the second signal indicates a beamforming capability corresponding to the at least one additional communication device; and
the communication device, being a PCP, is operative selectively to admit the at least one additional communication device into communications with the communication device based on the beamforming capability corresponding to the at least one additional communication device.

10. A communication device, comprising: an antenna; a radio circuitry, coupled to the antenna, that is operative to transmit a first signal, that includes a sounding physical layer (PHY) protocol data unit (PPDU), the first signal to establish beamforming during a period initiated under at least one of a contention access period and a channel time allocation period to at least one additional communication device via the antenna using a beamforming training protocol based on a device class of the communication device and/or the at least one additional communication device, the first signal declaring a beamforming capability that includes a transmit functionality and a receive functionality corresponding to the communication device, wherein: the first signal for establishing a configuration of the antenna based at least in part on a common beamforming capability with the at least one additional communication device; and the first signal is transmitted in accordance with the transmit functionality corresponding to the communication device; and an antenna weight vector circuitry, coupled to the radio circuitry, that is operative to calculate an antenna weight vector (AWV) based on the transmit functionality corresponding to the communication device and on a second signal, responsive to the first signal, received from the at least one additional communication device, the second signal indicating a beamforming capability that includes the transmit functionality and the receive functionality corresponding to the at least one additional communication device; and wherein: the second signal includes a plurality of training sequence symbols (TSS) and channel state information as calculated by at least one additional communication device based on the sounding PHY PPDU; the configuration of the antenna modified based on the AWV; and the antenna weight vector circuitry is operative to calculate the AWV based on the transmit functionality corresponding to the communication device and the receive functionality corresponding to the at least one additional communication device; and the radio circuitry is operative to transmit data to the at least one additional communication device via the antenna modified based on the AWV.

11. The communication device of claim 10, wherein:
the radio circuitry is operative to transmit the first signal via the antenna in a first direction; and
the radio circuitry is operative to transmit a third signal via the antenna in a second direction;
the radio circuitry is operative to receive a fourth signal from the at least one additional communication device, wherein the fourth signal is received in response to the third signal; and
the antenna weight vector circuitry is operative to update the AWV based on at least one of the second signal and the fourth signal.

12. The communication device of claim 10, wherein:
the transmit functionality and the receive functionality corresponding to the communication device are omni-directional;
the transmit functionality corresponding to the communication device is directional and the receive functionality of the communication device is omni-directional; or
the transmit functionality and the receive functionality corresponding to the communication device are directional.

13. The communication device of claim 12, wherein:
the transmit functionality and the receive functionality corresponding to the at least one additional communication device are omni-directional;
the transmit functionality corresponding to the at least one additional communication device is directional and the receive functionality corresponding to the at least one additional communication device is omni-directional; or
the transmit functionality and the receive functionality corresponding to the at least one additional communication device are directional.

14. The communication device of claim 10, wherein:
the communication device is a personal independent basis services set coordinator point (PCP);
the at least one additional communication device is a wireless station (STA);
the second signal indicates a beamforming capability corresponding to the at least one additional communication device; and
the communication device, being a PCP, is operative selectively to admit the at least one additional communication device into communications with the communication device based on the beamforming capability corresponding to the at least one additional communication device.

15. The communication device of claim 10, wherein:

the communication device is a wireless station (STA); and the at least one additional communication device is a personal independent basis services set coordinator point (PCP).

16. A method for operating a communication device, the method comprising: employing a radio circuitry to transmit a first signal to establish beamforming during a period initiated under at least one of a contention access period and a channel time allocation period to at least one additional communication device via an antenna using a beamforming training protocol based on a device class of the communication device and/or the at least one additional communication device, the first signal indicating a beamforming capability that declares a transmit functionality and a receive functionality corresponding to the communication device, wherein: the first signal for establishing a configuration of the antenna based at least in part on a common beamforming capability with the at least one additional communication device; and the first signal is transmitted in accordance with the transmit functionality corresponding to the communication device; and calculating an antenna weight vector (AWV) based on the transmit functionality corresponding to the communication device and on a second signal, responsive to the first signal, received from the at least one additional communication device, the second signal indicating a beamforming capability that includes a receive functionality corresponding to the at least one additional communication device; modifying the configuration of the antenna based on the AWV; and transmitting data from the communication device to the at least one additional communication device via the antenna modified based on the AWV.

17. The method of claim 16, further comprising:

employing the radio circuitry to transmit the first signal via the antenna in a first direction;

employing the radio circuitry to transmit a third signal via the antenna in a second direction;

employing the radio circuitry to receive a fourth signal, responsive to the third signal, from the at least one additional communication device; and updating the AWV based on at least one of the second signal and the fourth signal.

18. The method of claim 16, wherein:

the first signal includes a sounding physical layer (PHY) protocol data unit (PPDU); and the second signal includes a plurality of training sequence symbols (TSS).

19. The method of claim 16, wherein:

the communication device is a personal independent basis services set coordinator point (PCP);

the at least one additional communication device is a wireless station (STA);

the second signal indicates a beamforming capability corresponding to the at least one additional communication device; and further comprising:

using the communication device, being a PCP, selectively to admit the at least one additional communication device into communications with the communication device based on the beamforming capability corresponding to the at least one additional communication device.

20. The method of claim 16, wherein:

the communication device is a wireless station (STA); and the at least one additional communication device is a personal independent basis services set coordinator point (PCP).

\* \* \* \* \*